United States Patent
Kunduru et al.

(10) Patent No.: US 12,407,571 B2
(45) Date of Patent: Sep. 2, 2025

(54) ACHIEVING CONSISTENCY IN OVERLAY DATA MODELS TRANSACTIONS WITH A NETWORK DEVICE

(71) Applicant: ARISTA NETWORKS, INC., Santa Clara, CA (US)

(72) Inventors: Charanjith Kunduru, Cupertino, CA (US); Roman Olegovich Chertov, San Jose, CA (US); Itthichok Jangjaimon, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/446,555

(22) Filed: Aug. 9, 2023

(65) Prior Publication Data

US 2025/0055755 A1    Feb. 13, 2025

(51) Int. Cl.
*H04L 41/082*    (2022.01)

(52) U.S. Cl.
CPC .................. *H04L 41/082* (2013.01)

(58) Field of Classification Search
CPC ...................................... H04L 41/082
USPC ........................................ 709/220
See application file for complete search history.

(56) References Cited

U.S. PATENT DOCUMENTS

| | | | |
|---|---|---|---|
| 7,577,726 B1 * | 8/2009 | Conard | G06F 8/654 |
| | | | 709/221 |
| 9,369,431 B1 * | 6/2016 | Kirby | H04L 63/20 |
| 10,200,248 B1 * | 2/2019 | Jiang | H04L 41/0879 |
| 10,326,657 B1 * | 6/2019 | A | H04L 41/0859 |
| 10,382,265 B1 * | 8/2019 | Anburose | H04L 61/5076 |
| 10,558,542 B1 * | 2/2020 | A | G06F 11/3058 |
| 2017/0339002 A1 * | 11/2017 | Sigoure | H04L 41/08 |
| 2019/0334807 A1 * | 10/2019 | Clark | H04L 43/0817 |
| 2023/0292184 A1 * | 9/2023 | Barac | H04W 36/32 |

* cited by examiner

*Primary Examiner* — Ario Etienne
*Assistant Examiner* — Kidest Mendaye
(74) *Attorney, Agent, or Firm* — Sprinkle IP Law Group

(57) ABSTRACT

Systems and methods for reducing processing resources required for configuration updates in a network device by segregating configuration updates into a first set of direct updates and a second set of updates that require CLI commands. The first set of updates are to vendor-neutral configuration objects that are isomorphically mapped to corresponding native configuration objects. The second set of updates are to vendor-neutral configuration objects that are not isomorphically mapped to corresponding native configuration objects. The first set of updates is forwarded to a configuration agent, which applies them to the configuration stored in the system database. CLI commands that are generated for the second set of updates are forwarded to the configuration agent, which parses them and applies corresponding updates to the system database. The system database confirms successful updates to a configuration module which then updates its own vendor-neutral configuration information.

8 Claims, 9 Drawing Sheets

ACHIEVING CONSISTENCY IN OVERLAY DATA MODELS TRANSACTIONS WITH A NETWORK DEVICE

TECHNICAL FIELD

The disclosed embodiments relate generally to network device configuration, and more particularly to systems, methods and products for ensuring consistency between different configuration information stores within a network device.

BACKGROUND

Network devices can be configured using various means. A number of vendors use open source network management protocols (such as those defined by OpenConfig) for the configuration of their network devices. A configuration module receives requests to update various aspects of the configuration, stores the configuration information in a vendor-neutral format, and then communicates the updates to a configuration agent of the network device. Because the vendor-neutral configuration information may be different from the native configuration information stored by the network device, the configuration module generates CLI commands corresponding to each of the requested configuration updates and sends the CLI commands to the configuration agent, which parses the CLI commands and stores the configuration information in a system database.

There are a number of problems relating to updating the configuration of a network device in this manner. For instance, in some cases, a configuration update may affect a vendor-neutral configuration object in the configuration module that is directly mapped to a corresponding native configuration object stored in the system database, so generating CLI commands for these configuration objects, then processing those commands to generate updates to the corresponding native configuration objects and applying the updates unnecessarily uses computing resources. Additionally, the storage of the configuration information in multiple different locations and formats presents the problem that the configuration information stored in the different locations may be inconsistent.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
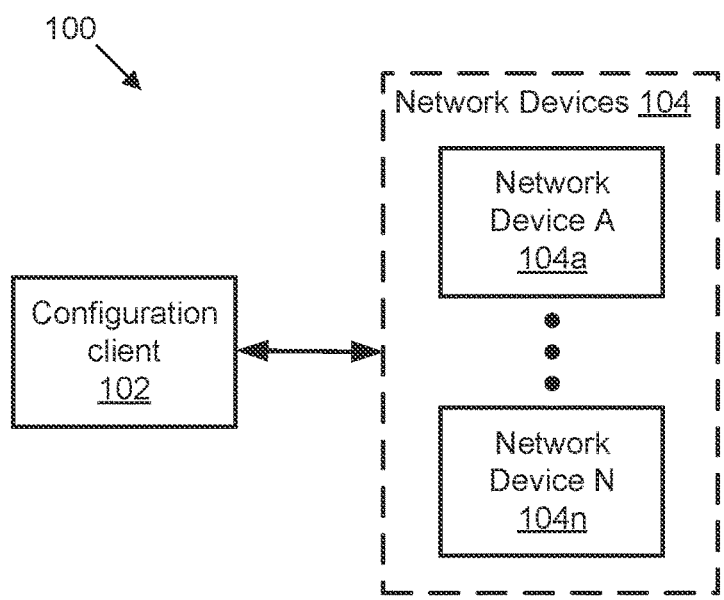
FIG. 1 is a block diagram illustrating a system including a configuration client and a set of network devices in accordance with the prior art.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein solve the problem of unnecessarily using computing resources in the generation, parsing and processing of CLI commands for directly mapped configuration objects by segregating or demultiplexing requested configuration updates into two different sets, where one set requires conventional generation and processing of CLI commands, but the other set involves directly mapped configuration objects and can therefore be directly provided to the configuration agent of the network device without having to generate or process corresponding CLI commands. Because the CLI commands generation and processing is eliminated for the second set of configuration updates, the computing resources that conventionally would have been used for CLI command generation and processing are made available for other purposes.

Embodiments disclosed herein may also resolve the foregoing problems of inconsistencies between configuration objects stored in different locations and different formats in a network device. These embodiments implement a mechanism to provide consistency among configuration information stores. In response to receiving configuration requests from a configuration client, the configuration module of the network device provides configuration updates based on the received requests to the configuration agent. The configuration agent makes corresponding updates to configuration information stored in a native format in a scratch copy of a system database. After all of the updates to the scratch copy have been completed and the resulting configuration has been validated, the information in the scratch copy is committed to the system database that is used in the control of the network device. After the system database confirms successful storage of the updated configuration information, the configuration module updates its stored configuration to reflect the confirmed configuration of the system database and responds to the received configuration requests.

The configuration module stores configuration information in a vendor-neutral data model that facilitates configuration of the network device. This model maintains a set of configuration objects in what is known as a YANG tree. The system database, on the other hand, stores configuration information in a data model that contains native-format configuration objects. Some of the configuration objects of the system database (and the configuration agent's scratch copy) are isomorphically mapped to configuration objects of the YANG tree, while others are not. In some embodiments, the configuration agent operates on a scratch copy of the configuration of the system database which contains the same native-format configuration objects.

When the configuration module receives a configuration request, it determines which of the configuration objects in its YANG tree are affected. The configuration module then identifies a first set of these objects that are isomorphically mapped to native configuration objects of the system database and a second set of YANG tree objects that are not isomorphically mapped to native configuration objects of the system database. In other words, the configuration module segregates, or demultiplexes ("demuxes") the received configuration updates into different groups based on whether they are mapped to corresponding native configuration objects.

Updates to the first set of configuration objects are forwarded directly to the configuration agent, which applies the updates to the corresponding native configuration objects. For updates to the second set of configuration objects, the configuration module generates corresponding CLI commands to update affected configuration objects of the system database. The CLI commands are then forwarded to the configuration agent, which applies the CLI commands to the corresponding native configuration objects.

Because the configuration module of the network device segregates the directly mapped configuration updates from the updates that require CLI commands, the network device does not waste computing resources generating CLI commands for the directly mapped updates. These updates are simply applied directly to the corresponding native configuration objects without having to generate corresponding CLI commands.

In some embodiments, the configuration agent uses a scratch copy of the system database configuration and applies the configuration updates to the scratch copy. After the scratch copy of the system database configuration has been updated according to the first set of configuration updates and the CLI commands received from the configuration module, the configuration agent validates the updated scratch copy of the configuration against one or more rules. If the updated configuration is valid, the updated configuration in the scratch copy is committed to the system database to be stored. If the updated configuration is not valid, the scratch copy is discarded and the configuration agent notifies the configuration module that the configuration update has failed.

If the updated configuration of the scratch copy is valid and has been committed to the system database, the system database stores the updated configuration objects. (If no scratch copy is used, the configuration agent simply applies the directly mapped updates directly to the system database, or runs the CLI commands to directly update the configuration objects stored in the system database.) After an updated configuration object is stored in the system database, the successful storage of the object is confirmed by the system database. This confirmation is provided to subscribed components, such as the configuration module. When the configuration module has received confirmation of an updated configuration object from the system database, the configuration module updates its own configuration. When the configuration module has received confirmation of all updates corresponding to a particular configuration request, it can respond to the configuration request (e.g., acknowledging the update to the configuration client). The configuration module can also respond to requests for configuration information using the confirmed configuration updates.

Because the configuration agent of the network device makes a scratch copy of the system configuration, processes the configuration updates to modify the configuration in the scratch copy and validate the configuration in the scratch copy before committing the updates to the system database, embodiments disclosed herein avoid inconsistencies that may otherwise arise from configuration updates that are made directly to the system database and must then be walked back if the configuration updates cannot be completed or are not valid as a whole. Further, by not updating the configuration stored in the configuration module until after the configuration updates as a whole have been made to the scratch copy in the configuration agent, committed to the system database and confirmed to the configuration module, consistency is maintained between the vendor-neutral configuration information in the configuration module and the native configuration information in the system database and configuration agent.

Figure 2:
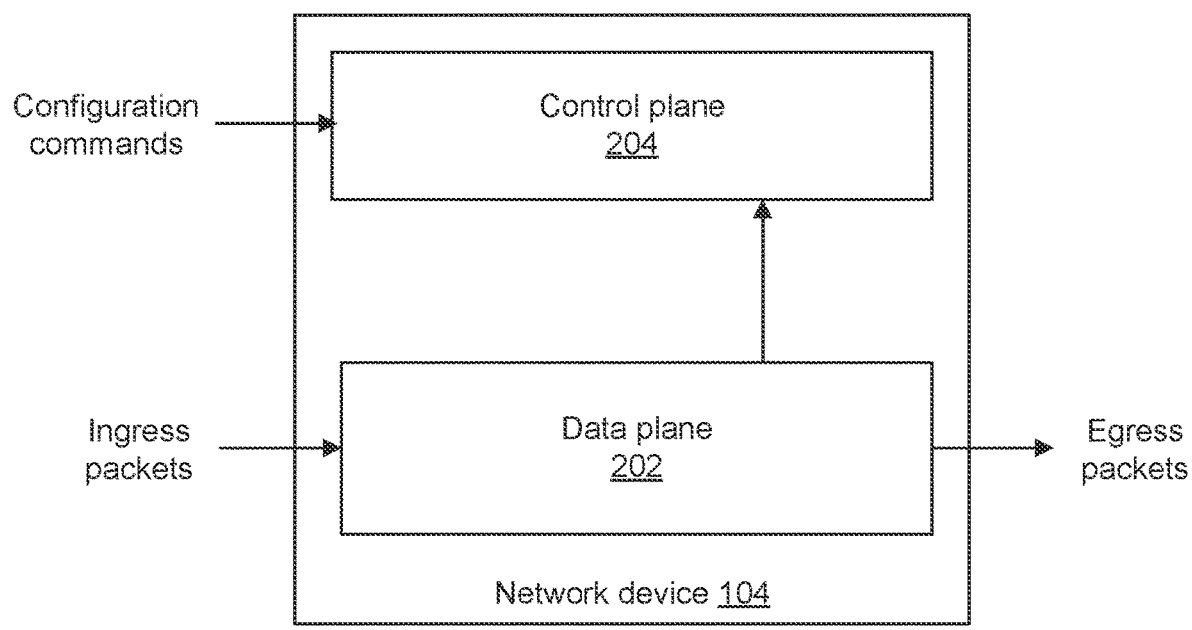
FIG. 2 is a block diagram illustrating the control and data planes of a network device in accordance with some embodiments.
Figure 3:
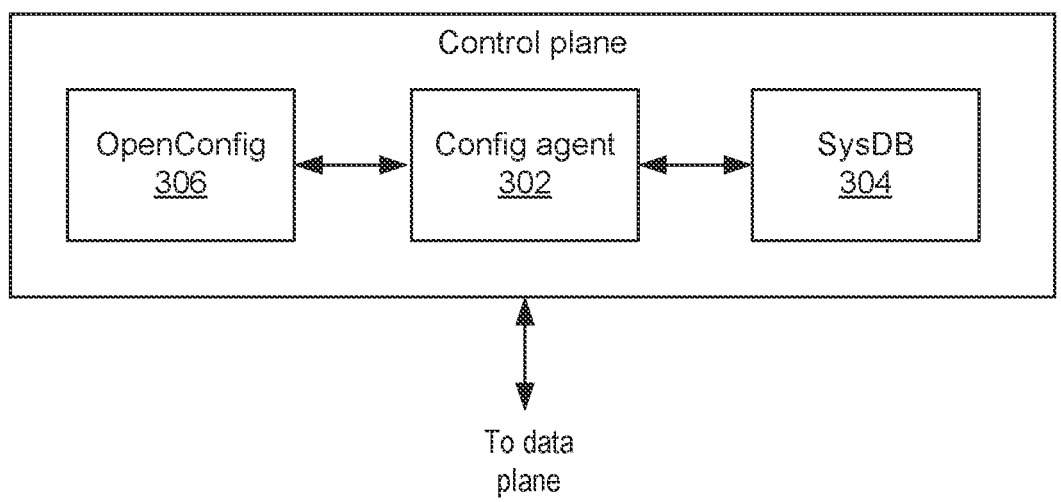
FIG. 3 is a block diagram illustrating a configuration agent and system database in the control plane of a network device in accordance with some embodiments.

FIGS. 1-3 show some of the relevant components of an exemplary system for ensuring consistency between different configuration information stores. FIG. 1 shows a system including a configuration client and a set of network switches. FIG. 2 shows the control and data planes of a network switch. FIG. 3 shows the configuration agent and system database in the control plane of the network switch.

Referring to FIG. 1, a system in accordance with one or more embodiments is shown. System 100 includes a network configuration client 102 and one or more network devices 104. These components may be directly or indirectly connected to each other using any combination of wired or wireless connections. In embodiments in which the components are indirectly connected to one another, there may be other network elements (or systems) that facilitate communication between the components. The components may communicate with each other using any combination of wired and/or wireless communication protocols. These components are described in more detail below.

It should be noted that different instances of the same or similar devices may be identified herein by a common reference number followed by a letter. For instance, as depicted in FIG. 1, this system includes network devices 104a-104n. The individual network devices may be referred to collectively by the number alone (e.g., network devices 104).

In one embodiment, a network device 104 is a physical device that includes persistent storage, memory (e.g., Random Access Memory, or RAM), one or more processors (including a switch chip), and two or more physical ports. In one or more embodiments, the switch chip is hardware that determines which egress port of a switch is used to forward media access (MAC) frames. The switch chip may also include ingress ports at which MAC frames are received to be forwarded via an appropriate egress port to another network device. Each port may or may not be connected to another device on a network, such as a server, a switch, a router, etc. The network device may be configured to receive packets via the ports and determine whether to (i) drop the packet, (ii) process the packet in accordance with one or more embodiments, and/or (iii) send the packet, based on the processing, out another port of the network element.

The persistent storage in the network element may include any type of non-transitory computer readable medium capable of storing instructions which, when executed by one or more processors in the network device, enable the network device to perform the functions of the device (as will be described below in accordance with example embodiments).

In some embodiments, configuration client 102 may be a software application executing on a client device. The client device can include any type of computing system that is configured to interact with network devices 104. For example, the client device may be a desktop computer operated by a network administrator. In this example, the network administrator may have configured the network devices to receive information or commands that are used to configure the network devices.

FIG. 2 shows a network device in accordance with some embodiments. Network device 104 includes a data plane 202 and a control plane 204. The data plane includes functionality to receive packets (which may be referred to as ingress packets) via ingress ports of the device. The network device processes the packets and transmits the packets, as appropriate, via the egress ports towards a destination. The transmitted packets may be referred to as egress packets. Data plane 202 also functions to gather data plane information and to provide this data plane information to control plane 204. Data plane information may include, for example, network usage data, data flow information based on the sampling of packets received by the network device, information related to queue depths on ingress and egress buffers in the data plane, and other data traffic statistics.

Control plane 204 includes functionality to manage the overall operation of the network device, including functionality to manage the operation of the data plane (e.g., programming the forwarding table). The control plane may also include functionality to receive and respond to commands that are used to configure the network device. Configuration information for the network device is stored in a system database (SysDB) in control plane 204, and the configuration information is used to control the operation of the network device, particularly with respect to the processing of received packets.

FIG. 3 shows the control plane 204 of an example network device in accordance with some embodiments. Control plane 204 includes a configuration agent 302, a system database (SysDB) 304 and a configuration module (OpenConfig) 306.

Configuration agent 302 implements one or more protocols, processes, and/or services of the network device. In particular, configuration agent 302 exposes an API to an OpenConfig module 306 for communication of configuration commands from OpenConfig to the configuration agent and returns API responses to OpenConfig responsive to the configuration commands. Configuration agent 302 also forwards corresponding configuration information to SysDB 304 to be stored in the network device configuration.

SysDB 304 may be implemented using any combination of shared and non-shared memory. SysDB 304 stores the current configuration of the network device, such as the values in the data structures used by any of the agents in the network device. SysDB 304 also stores values of variables and/or parameters that are currently specified in the network element. For example, the SysDB may include the current routing table entries as determined by the routing information base agent.

The specific content of the records in the SysDB may vary based on its specific implementation in the network device. A typical record within the SysDB may include, for example, the name of a variable or parameter, the current value of the variable or parameter, and a timestamp indicating when the record was created (or was last modified). While the SysDB shown in FIG. 3 is shown as a single unit, embodiments may implement portions of the SysDB in distributed units in different locations within the network device.

Configuration agent 302 includes functionality to access various portions of SysDB 304 in order to obtain the relevant portions of the configuration of the network device in order to perform updates to the configuration and to control the various functions of the network device. Configuration agent 302 includes functionality to: obtain the state of the network element and any updates to the state of the network element, obtain traffic statistics and/or other information from the data plane, and provide the information obtained to one or more target entities (e.g., third party devices, virtual machines executing on third party devices, etc.).

OpenConfig module 306 is a configuration module that implements a consistent set of vendor-neutral data models in the form of a YANG tree. This configuration module provides a programmatic interface and tools for a configuration client to manage the network device in a dynamic, vendor-neutral manner. While embodiments discussed herein use the data models developed by the OpenConfig working group, alternative embodiments may implement other data models. Accordingly, the use of the term "OpenConfig" herein should be construed as illustrative, rather than limiting.

Figure 4A:
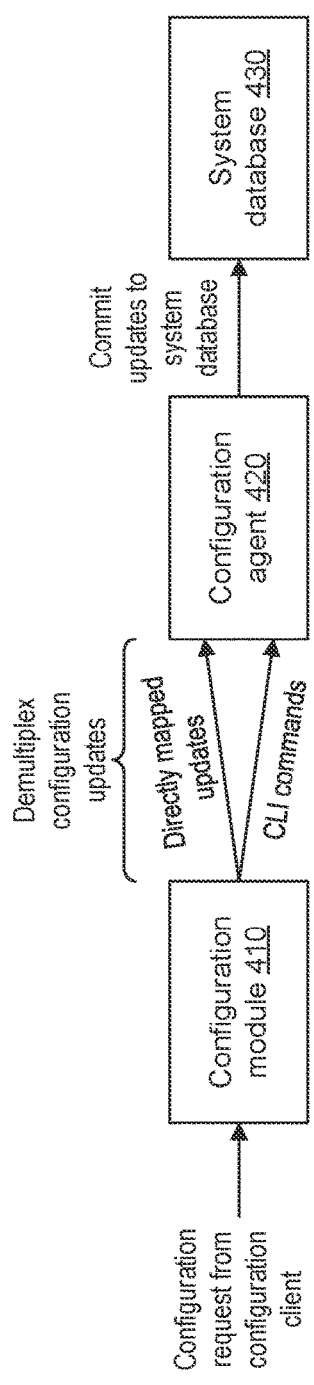
FIG. 4A is a diagram illustrating the segregation of updates provided to a configuration agent in accordance with some embodiments.

Referring to FIG. 4A, a diagram is shown to illustrate the processing of configuration updates in accordance with some embodiments. As shown in this figure, configuration updates are initiated by a configuration client and are processed, first by a configuration module 410, then a configuration agent 420, and finally a system database 430. These same components are involved in the processing of configuration updates in conventional systems, but the embodiments disclosed herein are distinct, in that the configuration module demultiplexes, or segregates the requested updates to the different configuration objects based on whether they can be applied directly to corresponding native configuration objects, or must be updated using generated CLI commands.

Beginning at the left side of the figure, a configuration request is received by configuration module 410 from a configuration client. The configuration request may include updates to multiple different configuration items which are stored in vendor-neutral configuration objects in a YANG tree maintained by the configuration module. The vendor-neutral configuration objects in the YANG tree include some objects that are isomorphically mapped to corresponding native configuration objects that are stored in system database 430 and other configuration objects that are not isomorphically mapped to native configuration objects. Configuration module 410 parses the configuration request received from the configuration client to identify the configuration updates for each of the vendor-neutral objects in the YANG tree and determines which updates affect isomorphically mapped configuration objects and which updates do not.

For each of the updates that affect a configuration object that is not isomorphically mapped to a native configuration object, the configuration module generates a corresponding CLI command that can be processed by the configuration agent to implement the update on one or more native configuration objects that are affected by the update. For each of the updates that affects an isomorphically mapped configuration object, the update can be directly applied to the corresponding native configuration object, so it is not necessary to generate a CLI command.

Configuration module 410 then sends the two groups of updates—the directly mapped updates and the updates embodied in the CLI commands—to configuration agent 420. The CLI commands are parsed and processed by configuration agent 420 to generate local updates that can be applied to the native configuration objects. These local updates are then applied to the native configuration objects. This processing is substantially the same as the processing that occurs in a conventional network device. The directly mapped updates, on the other hand, are applied by configuration agent 420 to the corresponding native configuration objects without first having to perform any significant processing on the updates. In some embodiments, the updates to the native configuration objects are simply applied by configuration agent 420 to system database 430, while in others, the updates are applied to native configuration objects in a scratch copy of the system database which is then validated before the updates to the native configuration objects are committed to the system database.

Figure 4B:
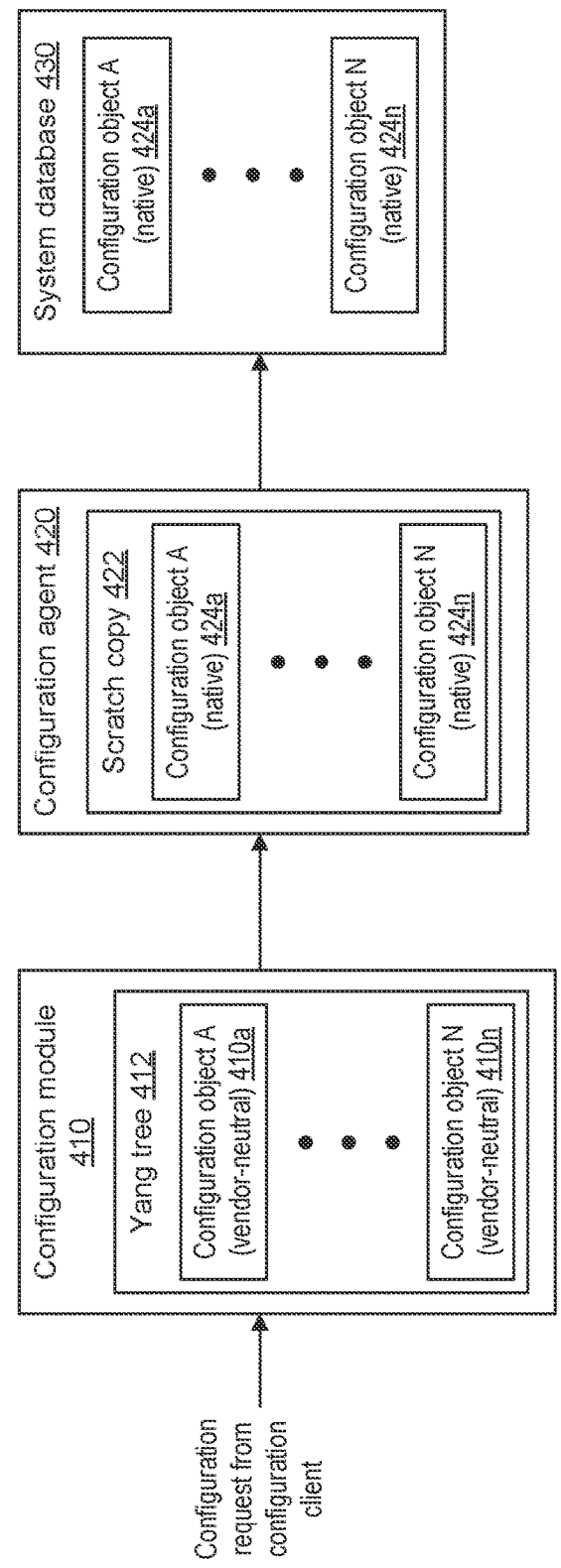
FIG. 4B is a diagram illustrating the relationship of the different configuration information stores in accordance with some embodiments.

Referring to FIG. 4B, a diagram is shown to illustrate the relationship of the different configuration information stores in accordance with some embodiments. As depicted in this figure, configuration information for a network device is stored in at least three locations: in configuration module 410; in configuration agent 420; and in system database 430. Within configuration module 410, configuration information is stored in YANG tree 412. Within configuration agent 420, configuration information is stored in a scratch copy 422 of the network device's system database. Then, of course, configuration information is stored in the system database itself.

As noted above, configuration requests are received by configuration module 410 from a configuration client or configuration source. A configuration request may affect only a single piece of configuration information which is stored in a corresponding configuration object, or it may affect multiple configuration objects with multiple pieces of configuration information. It should also be noted that, with respect to configuration objects that are not isomorphically mapped between the YANG tree of the configuration module and the system database, a single configuration object in the YANG tree can correspond to multiple objects in the system database, or vice versa.

When a configuration request is first received by configuration module 410, it does not immediately update the corresponding configuration objects 414 contained in YANG tree 412. Configuration module 410 instead processes the request and provides corresponding updates and/or CLI commands to configuration agent 420. Configuration agent 420 first obtains a scratch copy 422 of the configuration contained in system database 430. Configuration agent 420 then processes the updates and/or CLI commands received from configuration module 410 and updates the configuration objects 424 in scratch copy 422 according to the processed updates and/or CLI commands.

When all of configuration objects 424 in scratch copy 422 have been updated, configuration agent 420 validates the resulting configuration to ensure that there are no errors in the updated configuration. If configuration agent 420 finds any errors in the configuration stored in scratch copy 422, the configuration agent will discard the scratch copy and notify the configuration module that the configuration update failed. Assuming that the configurations stored in configuration module 410, configuration agent 420 and system database 430 were initially consistent, they will remain consistent following the failed configuration update.

If, when configuration agent 420 attempts to validate the configuration stored in scratch copy 422, the configuration is determined to be valid, configuration agent 420 will commit the updated configuration to system database 430. Configuration agent 420 will then copy the configuration objects from scratch copy 422 to system database 430. Since the configuration objects are copied from scratch copy 422 to system database 430, consistency between these two configuration stores is maintained.

The configuration objects are normally streamed from configuration agent 420 to system database 430. As each configuration object is successfully stored in the system database, confirmation is provided to any components of the network device (e.g., configuration module 410) which are subscribed to receive these confirmations. When configuration module 410 receives confirmation from system database 430 that a particular configuration object has been stored, the configuration module updates the corresponding configuration object 414 in YANG tree 412. After confirmations of all of the configuration updates have been received and the corresponding YANG tree configuration objects 414 have been updated, the configuration of YANG tree 412 is consistent with system database 430 and scratch copy 422 (although configuration agent 420 may discard scratch copy 422 after the configuration object updates have been successfully copied to system database 430).

Figure 5A:
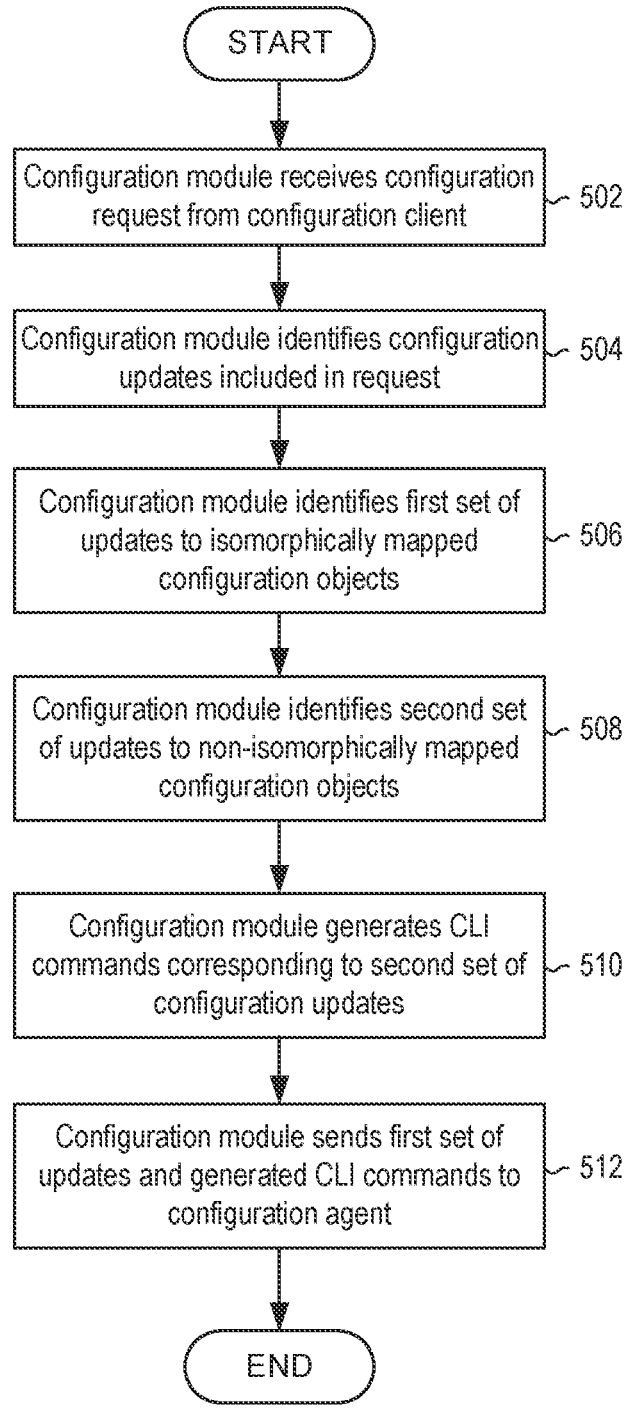
FIG. 5A is a flow diagram illustrating the processing of configuration requests by a configuration module in accordance with some embodiments.
Figure 5B:
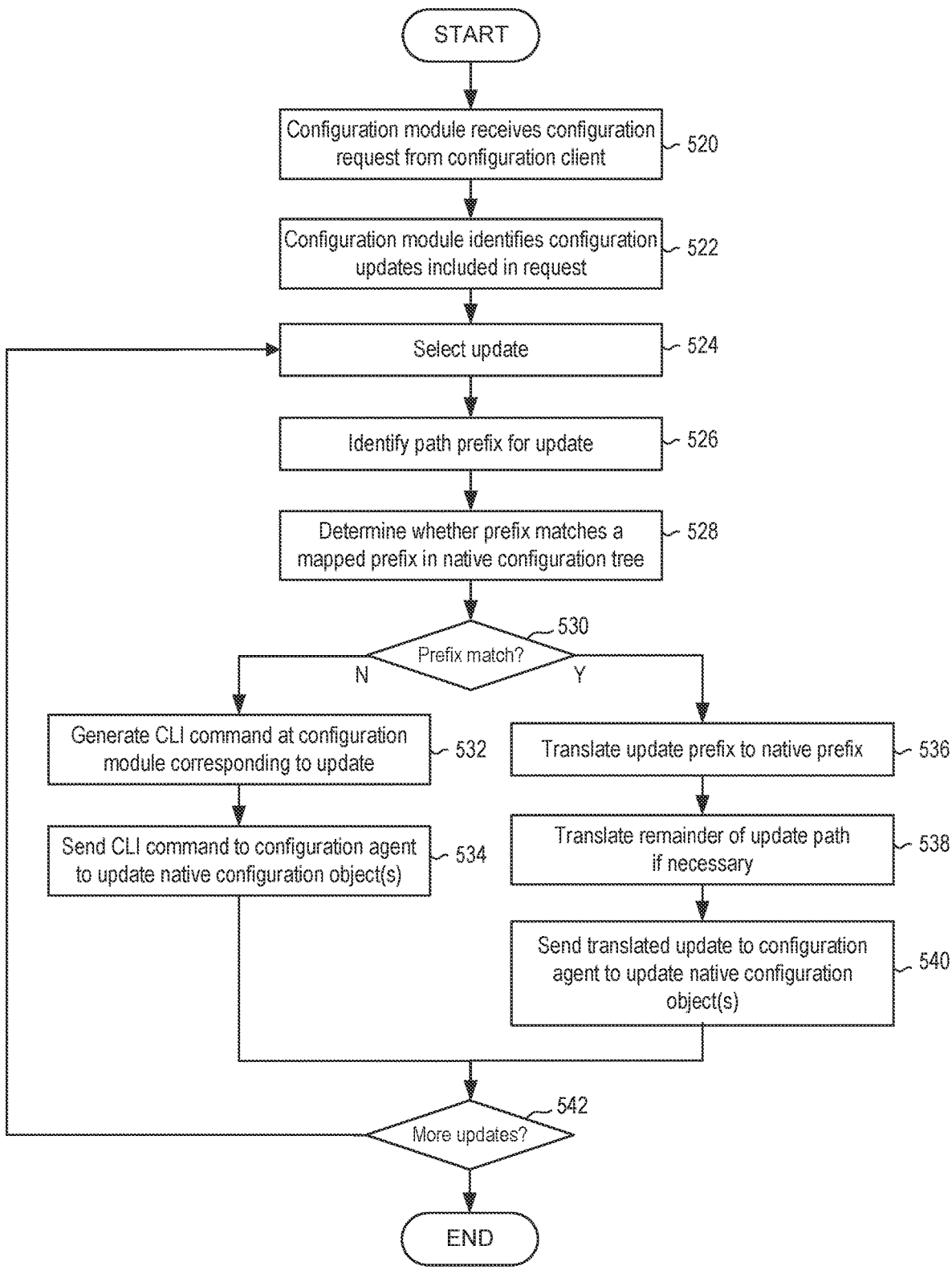
FIG. 5B is a flow diagram illustrating the segregated processing of configuration updates based on path prefixes in accordance with some embodiments.
Figure 6:
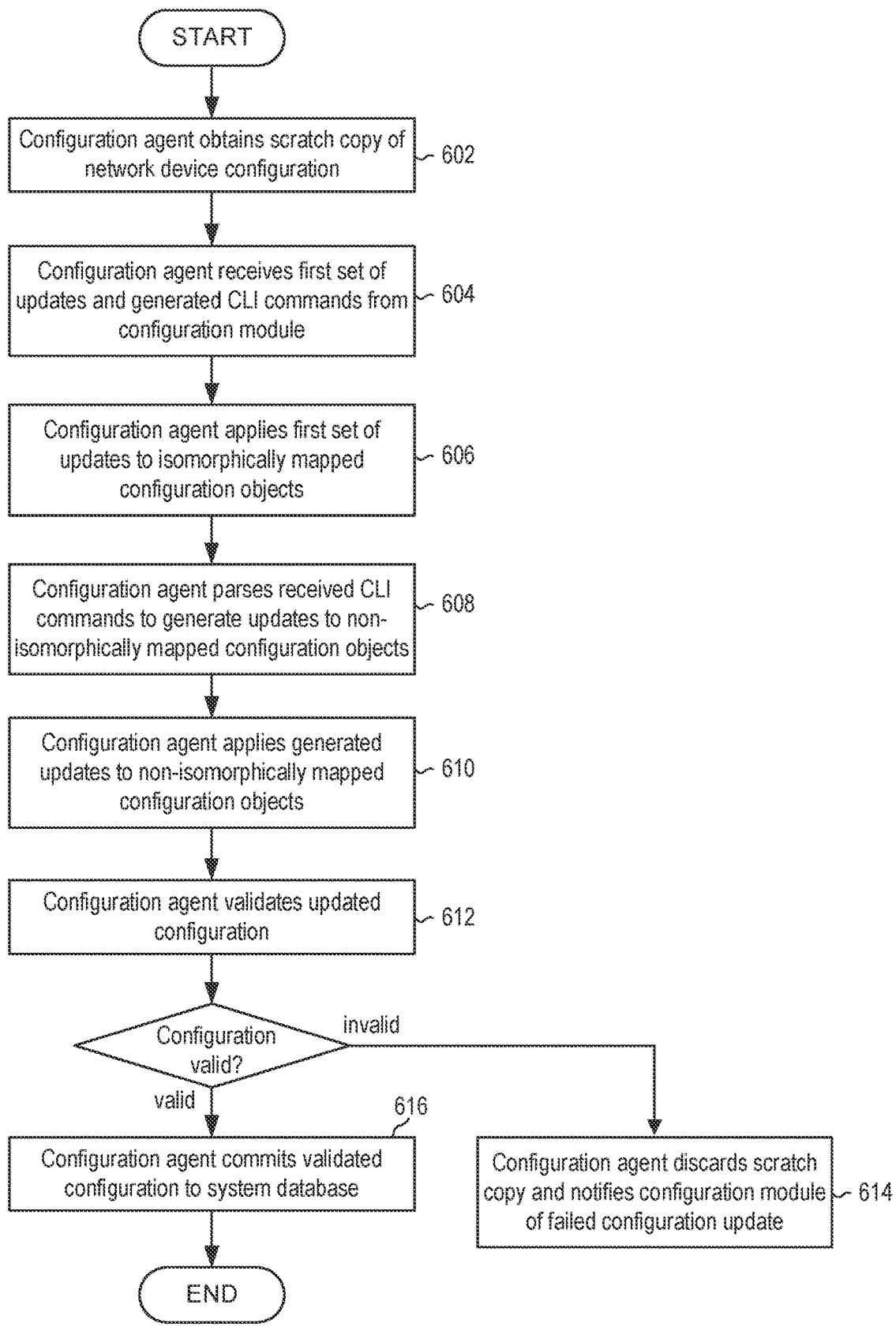
FIG. 6 is a flow diagram illustrating the processing of configuration updates by a configuration agent to update a scratch copy of a system database in accordance with some embodiments.
Figure 7:
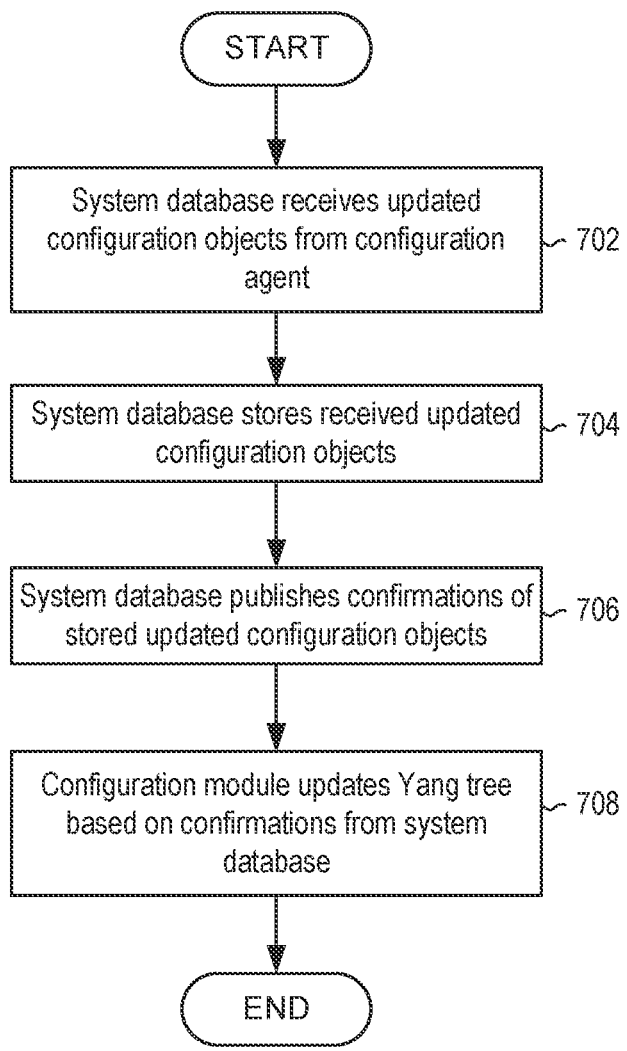
FIG. 7 is a flow diagram illustrating the updating of a system database and a configuration module's YANG tree in accordance with some embodiments.

Referring to FIGS. 5-7, a set of flow diagrams illustrating an example method for maintaining consistency between a configuration module, a configuration agent and a system database are shown. FIGS. 5A and 5B illustrate the processing of configuration requests by the configuration module. FIG. 6 illustrates the processing of configuration updates by the configuration agent to update a scratch copy of the system database. FIG. 7 illustrates the updating of the system database and the updating of the configuration module's YANG tree according to confirmations of successful updates to configuration objects in the system database.

Referring to FIG. 5A, the processing of configuration requests by the configuration module begins with the configuration module receiving a configuration request from a configuration client (502). The configuration request may be a request to update a single configuration item, or it may be a request to update multiple configuration items. Accordingly, the configuration request may ultimately affect a single configuration object or multiple objects in the YANG tree of the configuration module, as well as a single configuration object or multiple configuration objects in the system database.

After the configuration request is received by the configuration module, the configuration module identifies the configuration updates that are being requested (504). The requested updates will affect one or more of the configuration objects that are stored in the YANG tree maintained by the configuration module.

Some of the affected vendor-neutral configuration objects in the YANG tree are isomorphically mapped to corresponding native configuration objects in the configuration maintained by the system database. In other words, the configuration objects in the YANG tree are the same as the configuration objects in the system database. Consequently, updates to these vendor-neutral configuration objects can be forwarded directly from the configuration module to the configuration agent, where they can be applied to the corresponding native configuration objects.

Others of the vendor-neutral configuration objects are not isomorphically mapped to corresponding native configuration objects in the system database, so it is necessary to generate CLI commands corresponding to the updates to this set of vendor-neutral configuration objects in the YANG tree. The generated CLI commands can be sent from the configuration module to the configuration agent, so that the configuration agent can process these commands to update corresponding ones of the native configuration objects.

After the configuration module identifies the configuration updates that are being requested, it identifies a first set of the updates that involves vendor-neutral configuration objects that are isomorphically mapped to native configuration objects (506). The configuration module also identifies a second set of the updates that involve vendor-neutral configuration objects that are not isomorphically mapped to native configuration objects (508). For the second set of the updates, the configuration module generates a corresponding set of CLI commands (510). The configuration module then sends the first set of updates and the generated set of CLI commands to the configuration agent so that the configuration agent can update the native configuration objects according to these updates and CLI commands (512).

It should be noted that, although the method of FIG. 5 shows that the first set of configuration updates are sent from the configuration module to the configuration agent after the CLI commands are generated, alternative embodiments may perform the steps in a different order. For example, the configuration updates in the first set may be sent to the configuration agent before the CLI commands for the second set of updates are generated. Likewise, the ordering of the method steps disclosed elsewhere in this disclosure is exemplary, and the ordering may be different in alternative embodiments.

Referring to FIG. 5B, a flow diagram is shown to illustrate an example method for segregating isomorphically mapped configuration updates from non-isomorphically mapped configuration updates. At step 520, the configuration module receives a configuration request from a configuration client. The configuration module identifies the individual configuration updates that are included in the request (step 522). Each of these updates is examined to determine whether or not it updates a vendor-neutral configuration that is isomorphically mapped to a native configuration object.

At step 524, a first one of the individual updates is selected. A path prefix of the update is identified (step 526) and the prefix is examined to determine whether it matches a prefix in a native configuration tree that maps paths for the vendor-neutral configuration objects of the YANG tree to paths for native objects stored in the system database (528).

If at step 530 the path prefix for the update does not have a match in the native configuration tree, the configuration module generates a CLI command to implement a corresponding update of one or more native configuration objects (step 532). The CLI command is sent to the configuration agent, and the configuration agent parses the cli command and runs it to update the native configuration object(s) (step 534).

If at step 530 the path prefix for the update does have a match in the native configuration tree, the configuration module translates the prefix of the update path to the matching prefix in the native configuration tree (step 536). If necessary, the configuration module will also translate the remainder of the update path (e.g., if the native path uses a different name for the configuration object than is used for the vendor-neutral configuration object) (step 538). The translated path for the update is then sent to the configuration agent, which applies it to update the native configuration object (step 540). Once the configuration update has been processed by the configuration module, the configuration module determines whether there are additional updates that need to be processed (step542). If there are additional updates, the configuration module selects the next update (step 524) and processes it as described above. If there are no additional updates, the process terminates. It should be noted that the updates may be sent to the configuration agent as they are processed by the configuration module, or they may be sent as a group.

Following is an example of the process of FIG. 5B. In this example, the configuration module receives a configuration request (a gNMI set):

```
gNMI set{
    /components/hardware/fan/speed, 80
    /arista/varp/virtualMac, 01:02:03:04:05
}
```

This configuration request attempts to update the values of two configuration objects. Upon examining the first path, the configuration module determines that there is no match, so the path is used to generate the CLI command "conf environment fanspeed 80", which is sent to the configuration agent for processing. Upon examining the second path, the configuration module determines that there is a match, so the path is translated to "/Sysdb/varp/virtualMac, 01:02:03:04:05", which is sent to the configuration agent to directly update the corresponding configuration object.

Another example is as follows. Consider the update:
set update "macsec/mka/policies/policy [name=EBB]/config/key-server-priority" 20
First, a prefix match will be performed:

```
{
    "YANGPath": "/macsec/mka/policies/policy[name=%n]/config"
    "osSubpath": "policy[name=%n]",
    "osPath": "Sysdb/macsec/openconfig/policies",
},
```

In this instance, the prefix ("/macsec/mka/policies/") of the YANG path is determined to match the OS path prefix "Sysdb/macsec/openconfig/policies". The prefix is therefore translated, and the path becomes

```
set update
"Sysdb/macsec/openconfig/policies/policy[name=EBB]/key-server-priority" 20
```

In this example, it is assumed that the native configuration object name is different than the vendor-neutral name:

```
"InstanceIdentifiers": {
   "delayProtection": "delay-protection",
   "macsecServerPrecedence": "key-server-priority"
},
```

Consequently, the remainder of the path is translated as well:

```
set update
Sysdb/macsec/openconfig/policies/policy[name=EBB]/macsecServerPrecedence" 20
```

The configuration update is then sent to the configuration agent applied as:

```
Send gNMI path Set Update
"Sysdb/macsec/openconfig/policies/policy[name=EBB]/macsecServerPrecedence"
20
```

Referring to FIG. 6 the processing of configuration updates by the configuration agent begins with the configuration agent obtaining a scratch copy of the configuration of the network device (602). The configuration agent may, for example, access the system database and copy the configuration stored therein.

The configuration agent receives the first set of configuration updates and the CLI commands corresponding to the second set of configuration updates from the configuration module (604). The first set of configuration updates (for updates to native configuration objects which are isomorphically mapped to corresponding vendor-neutral configuration objects in the configuration module's YANG tree) are then applied to the respective native configuration objects in the scratch copy (606). The CLI commands received from the configuration module are parsed by the configuration agent to generate updates to ones of the native configuration objects which correspond to the second set of configuration updates identified by the configuration module (608). The updates generated by the configuration agent are then applied to the respective native configuration objects in the scratch copy (610).

After all of the updates from the configuration module (including the first set of updates and the updates corresponding to the received CLI commands) have been made to the native configuration objects in the scratch configuration agent, the configuration agent validates the updated configuration stored in the scratch copy (612). In some embodiments, this validation comprises applying one or more rules to the configuration and determining whether or not the configuration complies with the rules. The rules may implement business logic, safety checks, or the like (for example, the rules may not allow PGP to be configured on an interface which has no IP address). If the configuration stored in the scratch copy does not comply with the rules, the configuration is not valid, and a configuration exception or error is raised.

If validation of the configuration in the scratch causes any errors, the scratch copy is discarded and a notification is sent from the configuration agent to the configuration module indicating that the configuration update failed (614). If, on the other hand, the validation of the configuration in the scratch copy does not cause any errors, the configuration is committed to the system database (616). When the configuration is committed to the system database, the updated native configuration objects in the scratch copy are sent to the system database so that these configuration objects can be stored in the system database.

Referring to FIG. 7, a flow diagram is shown to illustrate the updating of the system database and the updating of the configuration module's YANG tree. This process begins when the system database receives the updated configuration objects from the configuration agent (702). The updated configuration objects may be streamed from the configuration agent to the system database and stored by the system database as they are received (704). As the updated configuration objects are stored by the system database, the system database publishes confirmations of the successful storage of the configuration objects (706). Other components of the network device (e.g., the configuration module) which are subscribed to these confirmations thereby receive notice of the successful storage of the updated configuration objects in the system database. When the configuration module receives confirmation of a configuration object corresponding to a particular configuration update, it updates the vendor-neutral configuration objects in its YANG tree (708). This maintains consistency between the system database and the configuration stored in the YANG tree of the configuration module.

If the configuration module receives a request for configuration information (e.g., via a gNMI Get) after it has sent the first set of configuration updates and the CLI commands corresponding to the second set of updates, but prior to receiving a confirmation of these updates from the system database, the configuration module may respond to the request, but it will respond with non-updated configuration information. After the configuration module has received from the system database confirmation of an update for a particular configuration object, the configuration module may respond with the updated configuration information for that object. Thus, when some of the configuration updates have been confirmed, but others have not, the configuration module will respond to some configuration information requests with non-updated information while responding to other requests with updated information. After all of the configuration updates have been confirmed by the system database, the configuration module will respond to configuration information requests with only updated information.

Figure 8A:
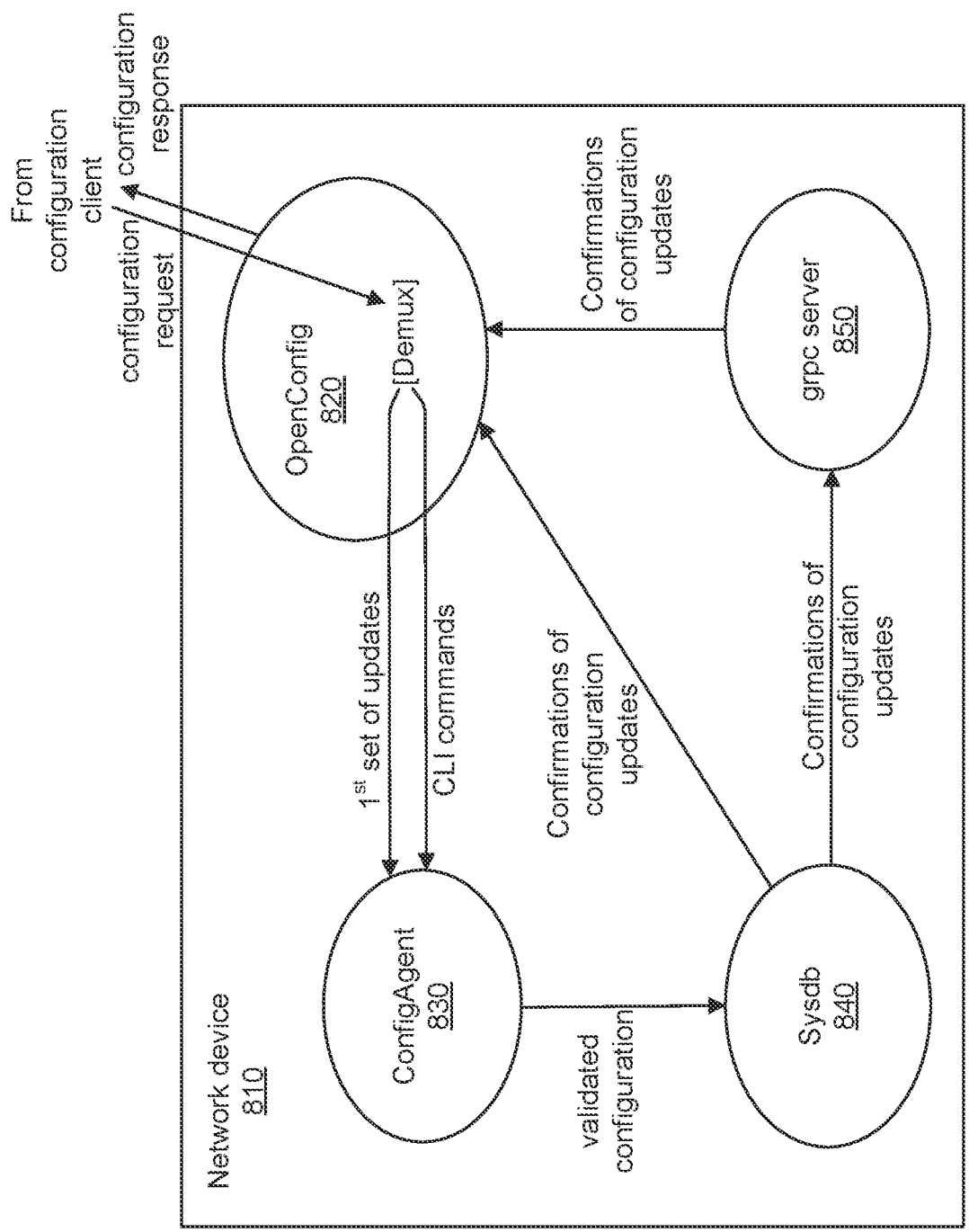
FIG. 8A is a diagram illustrating an example of a network device implementing a method for segregating configuration updates provided to a configuration agent in accordance with some embodiments.

Referring to FIG. 8A, an example of a network device implementing a method as described above is provided. As depicted in this figure, a network device 810 includes a configuration module (OpenConfig) 820, a configuration agent (ConfigAgent) 830, a system database (Sysdb) 840, and a grpc server 850.

OpenConfig 820 receives a gNMI Set request which specifies updates to one or more items of the network devices configuration. OpenConfig 820 creates a set session during which the configuration updates specified in the gNMI Set request will be processed and applied to the device. OpenConfig 820 processes the set request to identify first and second sets of configuration updates. As explained above, the first set of updates includes updates to vendor-neutral configuration objects in a YANG tree of OpenConfig 820 which are isomorphically mapped to corresponding native configuration objects of Sysdb 840 and ConfigAgent 830. The second set of updates includes updates which are not isomorphically mapped between vendor-neutral configuration objects of the YANG tree and native configuration objects of Sysdb 840. OpenConfig 820 generates CLI commands corresponding to the second set of updates.

As explained above, some embodiments differentiate between updates in the first set and updates in the second set by examining the path prefix for each update (where the path identifies a vendor-neutral configuration object in the YANG tree of OpenConfig 820) to determine whether it has a match in a native configuration tree of Sysdb 840). If the prefix of the vendor-neutral path has a match in the native path of Sysdb 840, the update falls within the first set of updates. The path is therefore translated to use the native path prefix and, if necessary, the name of the configuration object being updated is translated as well. The translated update can then be sent to ConfigAgent 830, which will apply the translated path to update the corresponding configuration object. As noted above, ConfigAgent 830 can apply the update directly to Sysdb 840, or it may apply the update to a scratch copy of Sysdb and verify the scratch copy before committing the update (and others) to Sysdb.

If, when the prefix of the vendor-neutral path is examined, it is determined that the prefix has no match in the native path of Sysdb 840, the update falls within the second set of updates. In this case, a CLI command (or possibly multiple CLI commands) is generated to effect the update to one or more native configuration objects. The generated CLI command is then sent to ConfigAgent 830, which will run the CLI command to update the appropriate native configuration objects. As with the directly mapped configuration updates, ConfigAgent 830 can process the CLI command to generate updates that are directly applied to Sysdb 840, or it may use the CLI command to update a scratch copy of Sysdb, which is verified before committing the updates to Sysdb.

As Sysdb 840 receives the configuration updates from ConfigAgent 830, it stores the updated values for the configuration objects and publishes confirmations of the successful storage of the updated configuration objects. The published confirmations are provided to any network device components that subscribe to the confirmations. For instance, OpenConfig 820 receives the confirmations. Alternatively, or additionally, grpc server 850 may receive the confirmations and may communicate corresponding updates to OpenConfig 820.

When OpenConfig 820 receives a confirmation for a particular configuration update, it updates the corresponding vendor-neutral configuration object(s) in YANG tree 822. After all of the updated native configuration objects have been stored and confirmed by Sysdb 840 and corresponding updates have been made to the vendor-neutral configuration objects in YANG 322, OpenConfig 820 ends the Set session. At this point, OpenConfig 820 responds to the gNMI Set request originally received from the configuration client, confirming that the configuration updates have been successfully completed.

Figure 8B:
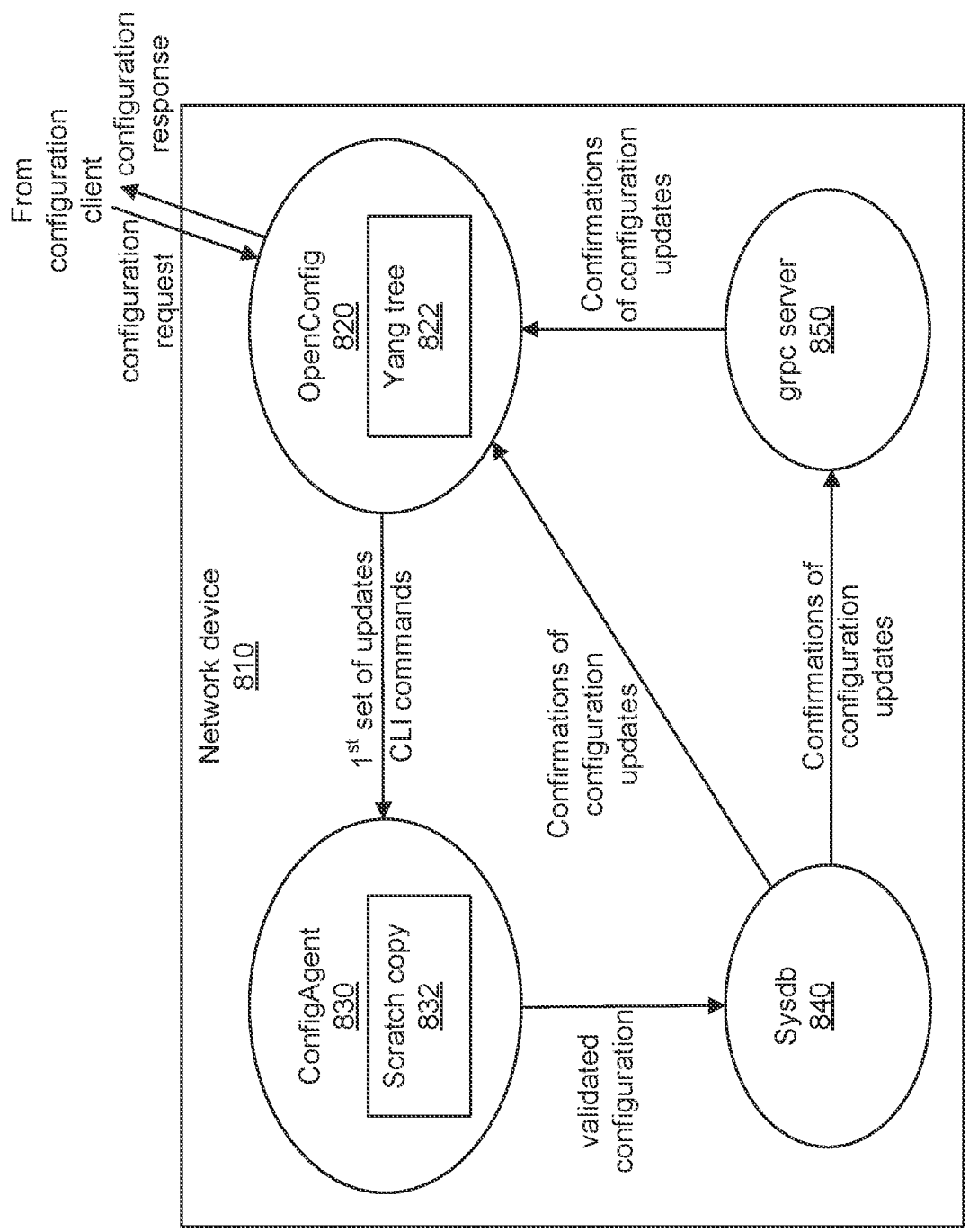
FIG. 8B is a diagram illustrating an example of a network device implementing a method for maintaining consistency between configuration information stored in different locations in accordance with some embodiments.

Referring to FIG. 8B, a diagram is shown to illustrate the locations in which configuration information is stored in the example network device of FIG. 8A. As noted above, configuration information in this network device is stored in the YANG tree 822 of OpenConfig 820, a scratch copy 832 of ConfigAgent 830, and in Sysdb 840.

As depicted in this figure, a network device 810 includes a configuration module (OpenConfig) 820, a configuration agent (ConfigAgent) 830, a system database (Sysdb) 840, and a grpc server 850.

When OpenConfig 820 receives the gNMI Set request from the configuration client, it creates a set session during which the configuration updates are processed and applied to the device. ConfigAgent 830 obtains a scratch copy 832 of the system configuration to be used for the Set session. In this example, ConfigAgent 830 copies the configuration stored in Sysdb 840. ConfigAgent 830 applies the first set of configuration updates received from OpenConfig 820 to the configuration objects stored in scratch copy 832. The CLI commands received from OpenConfig 820 are parsed by ConfigAgent 830 and are processed to update corresponding configuration objects stored in scratch copy 832.

At this point, the configuration information stored in scratch copy 832 is consistent with the Set request which was received by OpenConfig 820. the stored configuration, however, may not be a valid configuration. For example, one or more of the updated configuration objects may have invalid values. Further, even though the configuration objects may be valid individually, the objects may be inconsistent with each other so that the configuration as a whole is invalid.

ConfigAgent 830 therefore validates the configuration by applying a set of rules to the configuration information. If the rules are not satisfied, the updated configuration is invalid, so ConfigAgent 830 discards scratch copy 832 and provides a notification to OpenConfig 820 that the configuration update has failed. OpenConfig 820 then ends the Set session and provides a response to the configuration client that the configuration update failed. Since the configuration updates were stored by ConfigAgent 830 in now-discarded scratch copy 832, Sysdb 840 has not been updated and retains the valid configuration stored prior to receipt of the gNMI Set by OpenConfig 820. Likewise, although OpenConfig processed the configuration updates and forwarded the updates or corresponding CLI commands to ConfigAgent 830, it did not update the configuration objects in its YANG tree 822, so the configuration in the YANG tree remains valid and consistent with the non-updated configuration in Sysdb 840.

If, when ConfigAgent 830 validates the configuration stored in scratch copy 832, it is determined that the configuration satisfies the applied validation rules, the configuration is valid, and ConfigAgent 830 commits the updated configuration to Sysdb 840. The updates to the individual configuration objects are streamed to Sysdb 840 to be stored.

As Sysdb 840 receives the updated configuration objects from ConfigAgent 830, it stores them and publishes confirmations of the successful storage of the updated configuration objects. The published confirmations are provided in this case to OpenConfig 820 and grpc server 850. As OpenConfig 820 receives confirmations for each configuration update, it updates the corresponding vendor-neutral configuration object(s) in YANG tree 822. When all of the configuration updates have been made to the vendor-neutral configuration objects in YANG tree 822, OpenConfig 820 ends the Set session. At this point, the configuration information stored in Sysdb 840 is consistent with the configuration information stored in YANG tree 822. When the updates to YANG tree 822 are complete, OpenConfig 820 responds to the configuration client's gNMI Set request to confirm that the configuration updates have been successfully completed.

There may be many alternative embodiments that fall within the scope of this disclosure. For example, one alternative embodiment comprises a method for achieving consistency between configuration data models in a network device. The method includes receiving, by a configuration module of the network device, a configuration set request from a configuration client, where the configuration set request includes updates to a plurality of first configuration objects of a first configuration data model maintained by the configuration module. The configuration module determines a first subset of the updates that directly modify corresponding second configuration objects of a scratch copy of the system database, and a second subset of the updates that do not directly modify corresponding second configuration objects of the scratch copy. The configuration module generates a set of CLI commands corresponding to the second set of the updates. The configuration module then forwards the first subset of the updates and the generated CLI commands to a configuration agent. The configuration agent obtains a scratch copy of a second configuration model and applies the first subset of the updates to the corresponding second configuration objects of the scratch copy. The configuration agent also parses the set of CLI commands to produce an additional set of updates to corresponding second configuration objects of the scratch copy and applies the additional set of updates to the corresponding second configuration objects of the scratch copy.

In this method, the first subset of the updates may comprise updates to first configuration objects in the first data model that are isomorphically mapped to corresponding second configuration objects in the second data model. The method may also include, in response to receiving the configuration set request, initiating a set session, where the configuration module is prevented from accepting a new configuration set request while a current set session is in progress. The method may further include, in response to the configuration module receiving notifications that all updates associated with the configuration set request have been received, terminating the set session.

The method may also include receiving, by the configuration module, one or more get requests while the set session is pending and, in response to the one or more get requests, providing current values for requested configuration objects. The current values for the requested configuration objects may be provided without regard to whether corresponding updates have been applied to the configuration objects.

The method may also include, after all of the first subset of the updates and the additional set of updates have been applied to the corresponding second configuration objects of the scratch copy, applying by the configuration agent one or more rules to the resulting updated scratch copy. The method may additionally include, in response to determining that the updated scratch copy satisfies the one or more rules, saving the updated second configuration objects of the scratch copy to corresponding system configuration objects of the system database and publishing notifications confirming the saved system configuration objects. The method may further include, in response to determining that the updated scratch copy fails to satisfy the one or more rules, discarding the scratch copy and publishing a notification of the failure.

Another alternative embodiment comprises a method for updating configuration data in a network device. This method includes receiving, by a configuration module of the network device, a configuration set request from a configuration client, wherein the configuration set request includes updates to a plurality of first configuration objects of a first configuration data model maintained by the configuration module. The configuration module determines a first subset of the updates that modify ones of the first configuration objects that are isomorphically mapped to corresponding second configuration objects of a second configuration model of a system database, and a second subset of the updates that do not modify ones of the first configuration objects that are not isomorphically mapped to corresponding second configuration objects of the second configuration model. The configuration module generates a set of CLI commands corresponding to the second set of the updates and forwards the first subset of the updates and the generated CLI commands to a configuration agent.

The method may include, in response to receiving the configuration set request, initiating a set session, wherein the configuration module is prevented from accepting a new configuration set request while a current set session is in progress. The method may also include, in response to the configuration module receiving notifications that all updates associated with the configuration set request have been received, terminating the set session.

The method may include receiving, by the configuration module, one or more get requests while the set session is pending and, in response to the one or more get requests, providing current values for requested configuration objects. In this method, the current values for the requested configuration objects may be provided without regard to whether corresponding updates have been applied to the configuration objects. The method may also include, in response to receiving confirmation of successful updating of a configuration in a system database, updating the plurality of first configuration objects of the first configuration data model according to the configuration in the system database.

Another alternative embodiment is a method for updating configuration data in a network device. This method includes obtaining, by a configuration agent of the network device, a scratch copy of a configuration of a network device. The scratch copy may be a copy of a configuration stored in the system database of the network device. The configuration agent receives a first set of direct configuration updates to the configuration and a set of CLI commands and applies the first set of the direct configuration updates to corresponding configuration objects of the scratch copy. The configuration agent parses the set of CLI commands to produce an additional set of configuration updates to corresponding configuration objects of the scratch copy and applying the additional set of updates to the corresponding configuration objects of the scratch copy.

The method may further include, after all of the first subset of the updates and the additional set of updates have been applied to the corresponding second configuration objects of the scratch copy, applying by the configuration agent one or more rules to the resulting updated scratch copy. Additionally, the method may include, in response to determining that the updated scratch copy satisfies the one or more rules, saving the updated second configuration objects of the scratch copy to corresponding system configuration objects of the system database and publishing notifications confirming the saved system configuration objects. Still further, the method may include, in response to determining that the updated scratch copy fails to satisfy the one or more rules, discarding the scratch copy and publishing a notification of the failure.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope of this disclosure.

What is claimed is:

1. A method for updating configuration data in a network device, the method comprising:

receiving, by a configuration module of the network device, a configuration set request from a configuration client, wherein the configuration set request includes updates to a plurality of vendor-neutral configuration objects of a vendor-neutral configuration data model maintained in memory at the network device by the configuration module;

determining, by the configuration module,
   a first subset of the updates that modify ones of the vendor-neutral configuration objects, wherein the modified ones of the vendor-neutral configuration objects are isomorphically mapped to corresponding native configuration objects of a system database maintained in memory of the network device, and
   a second subset of the updates that modify ones of the vendor-neutral configuration objects, wherein the ones of the vendor-neutral configuration objects modified by the second subset are not isomorphically mapped to corresponding native configuration objects of the system database;

generating, by the configuration module, a set of CLI commands corresponding to the second set of the updates, wherein the set of CLI commands are adapted to modify native configuration objects of the system database to effect the second set of updates when executed; and forwarding, by the configuration module, the first subset of the updates and the generated CLI commands to a configuration agent of the network device.

2. The method of claim 1, wherein determining the first subset of the updates and the second subset of the updates comprises, for each of the updates:

identifying a path prefix for the update;

determining whether the prefix matches one of a set of native path prefixes; and if the prefix matches one of the native path prefixes, determining that the update is in the first subset of the updates and otherwise determining that the update is in the second subset of the updates.

3. The method of claim 2, wherein:

determining whether the prefix matches one of the set of native path prefixes comprises determining whether the prefix is included in a mapping of prefixes to native path prefixes;

in response to determining that the update is in the first subset of the updates, replacing the prefix with the corresponding native path prefix; and in response to determining that a vendor-neutral configuration object name of the update is different from a native configuration object name of the corresponding mapped native path, translating the vendor-neutral configuration object name of the update to the native configuration object name.

4. The method of claim 1, further comprising, in response to receiving the configuration set request, initiating a set session, wherein the configuration module is prevented from accepting a new configuration set request while a current set session is in progress.

5. The method of claim 4, further comprising, in response to the configuration module receiving notifications that all updates associated with the configuration set request have been received, terminating the set session.

6. The method of claim 1, further comprising receiving, by the configuration module, one or more get requests while the set session is pending and, in response to the one or more get requests, providing current values for requested configuration objects.

7. The method of claim 6, wherein the current values for the requested configuration objects are provided without regard to whether corresponding updates have been applied to the configuration objects.

8. The method of claim 1, further comprising, in response to receiving confirmation of successful updating of a configuration in a system database, updating the plurality of vendor-neutral configuration objects of the vendor-neutral configuration data model according to the configuration in the system database.

* * * * *